UNITED STATES PATENT OFFICE.

JAMES M. CORDRAY, OF LOS ANGELES, CALIFORNIA.

TREE-WAX.

1,054,751. Specification of Letters Patent. Patented Mar. 4, 1913.

No Drawing. Application filed March 1, 1912. Serial No. 681,008.

*To all whom it may concern:*

Be it known that I, JAMES M. CORDRAY, citizen of the United States, residing at Los Angeles, in the county of Los Angeles and State of California, have invented certain new and useful Improvements in Tree-Wax, of which the following is a specification.

This invention aims to disclose a compound to be applied to the trunks and limbs of trees from which the bark has been torn, or eaten, and which will prevent the exudation of the sap, protect the bruised surface from the elements and promote the growth of new bark.

It is a well-known fact that trees, and particularly fruit trees, when barked, soon become rotted, due to the exudation, or drying out of the sap, and are similarly affected when attacked by the borer and other insects. It has been proposed to protect the injured surface by the application of various substances which, when dry, will form a hard protective coating but a coating of such nature will crack when subjected to temperature changes and will furthermore resist the growth of new bark. I therefore, propose to provide a compound for the purpose stated, which will not harden after it has been applied and will yield to the progressive growth of new bark over the exposed surface.

Another aim of the invention is to provide a compound such as stated which will destroy any parasites which may have begun to attack the injured surface.

The compound embodying the invention consists of the following ingredients substantially in the proportions stated: Pine resin 3 ounces and 56 grains, beeswax 1 ounce and 184 grains, beef tallow 336 grains, unslaked lime 2 grains, cotton seed oil 120 drops.

In mixing the compound, the tallow is placed in a suitable receptacle over a fire and heated until melted and to it is added the beeswax. These ingredients are thoroughly stirred and when the mixture is perfectly fluid the pine resin is added, and subsequently the unslaked lime. Finally, the cotton seed oil is added and the mixture is thoroughly stirred until the resin has melted. Upon cooling, the compound is ready for use.

The resin possesses marked curative properties and will promote the growth of new bark. The tallow renders the compound ceraceous as does also the beeswax and this latter ingredient in addition, possesses curative properties and renders the compound water proof and protects the surface, to which it is applied, from air. The cotton seed oil prevents drying out of the compound so that when applied it will remain indefinitely in a ceraceous condition, and the unslaked lime acts to kill any parasites upon the surface.

From the foregoing it will be readily understood that there is provided a compound which may be conveniently applied and which, after application will not dry out or become hard and will therefore not be liable to crack nor resist the growth of new bark. It will further be understood that the compound possesses healing properties, and while it does not act to fill the pores or shrink the fibers of the tree to which it is applied, it effectually prevents the exudation of sap.

It will be understood, of course, that the proportions of the ingredients may be varied, but I have found by experiment, that when compounded in substantially the properties herein stated, the resulting mixture will require no heating prior to its application and can be readily worked between the fingers and shaped to cover the part to be treated.

Having thus described the invention what is claimed as new is:—

1. A tree wax consisting of a mixture of a resinous substance, lime and a ceraceous and oleaginous vehicle.

2. A tree wax consisting of a mixture of pine resin, lime and a ceraceous vehicle.

3. A tree wax, consisting of a mixture of a resinous substance, lime and a vehicle consisting of a ceraceous substance and an oil.

4. A tree wax, consisting of a mixture of pine resin, beeswax, tallow, unslaked lime and cotton seed oil.

5. A tree wax, consisting of a mixture of pine tree resin, beeswax, tallow, unslaked lime and cotton seed oil, in about the proportions of pine tree resin 3 ounces and 56 grains, beeswax 1 ounce and 184 grains, beef tallow 336 grains, unslaked lime 2 grains, and cotton seed oil 120 drops.

In testimony whereof I affix my signature in presence of two witnesses.

JAMES M. CORDRAY.

Witnesses:
   ALVIN GALLAHER,
   Mrs. M. A. CORDRAY.